US010586403B2

(12) United States Patent
Lagowski (nee Giles) et al.

(10) Patent No.: US 10,586,403 B2
(45) Date of Patent: Mar. 10, 2020

(54) COMMUNICATION MODULE AND OCCUPANCY COUNTER

(71) Applicant: Gentex Corporation, Zeeland, MI (US)

(72) Inventors: Autumn N. Lagowski (nee Giles), Holland, MI (US); Michael J. Metivier, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/168,271

(22) Filed: Oct. 23, 2018

(65) Prior Publication Data

US 2019/0130657 A1  May 2, 2019

Related U.S. Application Data

(60) Provisional application No. 62/578,227, filed on Oct. 27, 2017.

(51) Int. Cl.
*G07B 15/06* (2011.01)
*B60R 1/04* (2006.01)
*B60R 1/12* (2006.01)

(52) U.S. Cl.
CPC ............. *G07B 15/063* (2013.01); *B60R 1/04* (2013.01); *B60R 1/12* (2013.01); *B60R 2001/1215* (2013.01)

(58) Field of Classification Search
CPC ......... G06Q 10/08; G07B 15/00; G07B 15/02
USPC ........................................ 235/384, 375, 487
See application file for complete search history.

(56) References Cited

U.S. PATENT DOCUMENTS

| | | | |
|---|---|---|---|
| 6,501,387 B2 | 12/2002 | Skiver et al. | |
| 6,693,517 B2 | 2/2004 | McCarthy et al. | |
| 7,817,020 B2 | 10/2010 | Turnbull et al. | |
| 2006/0125603 A1 | 6/2006 | Nahear | |
| 2012/0140080 A1* | 6/2012 | Taylor | B60C 23/0408 348/148 |
| 2013/0238167 A1* | 9/2013 | Stanfield | G08G 1/20 701/2 |
| 2013/0342336 A1* | 12/2013 | Kiefer | B60W 50/14 340/436 |

(Continued)

FOREIGN PATENT DOCUMENTS

CN          201435147 Y        3/2010

*Primary Examiner* — Edwyn Labaze
(74) *Attorney, Agent, or Firm* — Price Heneveld LLP; Bradley D. Johnson

(57) ABSTRACT

A method for selecting a number of occupants for a wireless communication system is disclosed. The method comprises receiving an input to a user input of a mirror assembly of a vehicle. In response to the input, the method continues by activating a communication module to an active state and activating a status indicator indicating the active state. The method further comprises determining a stored occupant number from a memory and activating an occupancy indicator to illuminate at a first predetermined frequency for a first number of illuminations. The first number of illuminations of the occupancy indicator is equal to the occupant number. The method further comprises monitoring for the user input for an input time period. In response to receiving the input to the user input during the input time period, the method continues by incrementing the occupant number to an updated occupant number.

14 Claims, 7 Drawing Sheets

(56) References Cited

U.S. PATENT DOCUMENTS

2014/0022070 A1\* 1/2014 Golomb .............. B60Q 1/0082
340/475
2017/0364719 A1\* 12/2017 Boehm ................ G07B 15/063
2018/0184376 A1 6/2018 Geerlings \* cited by examiner

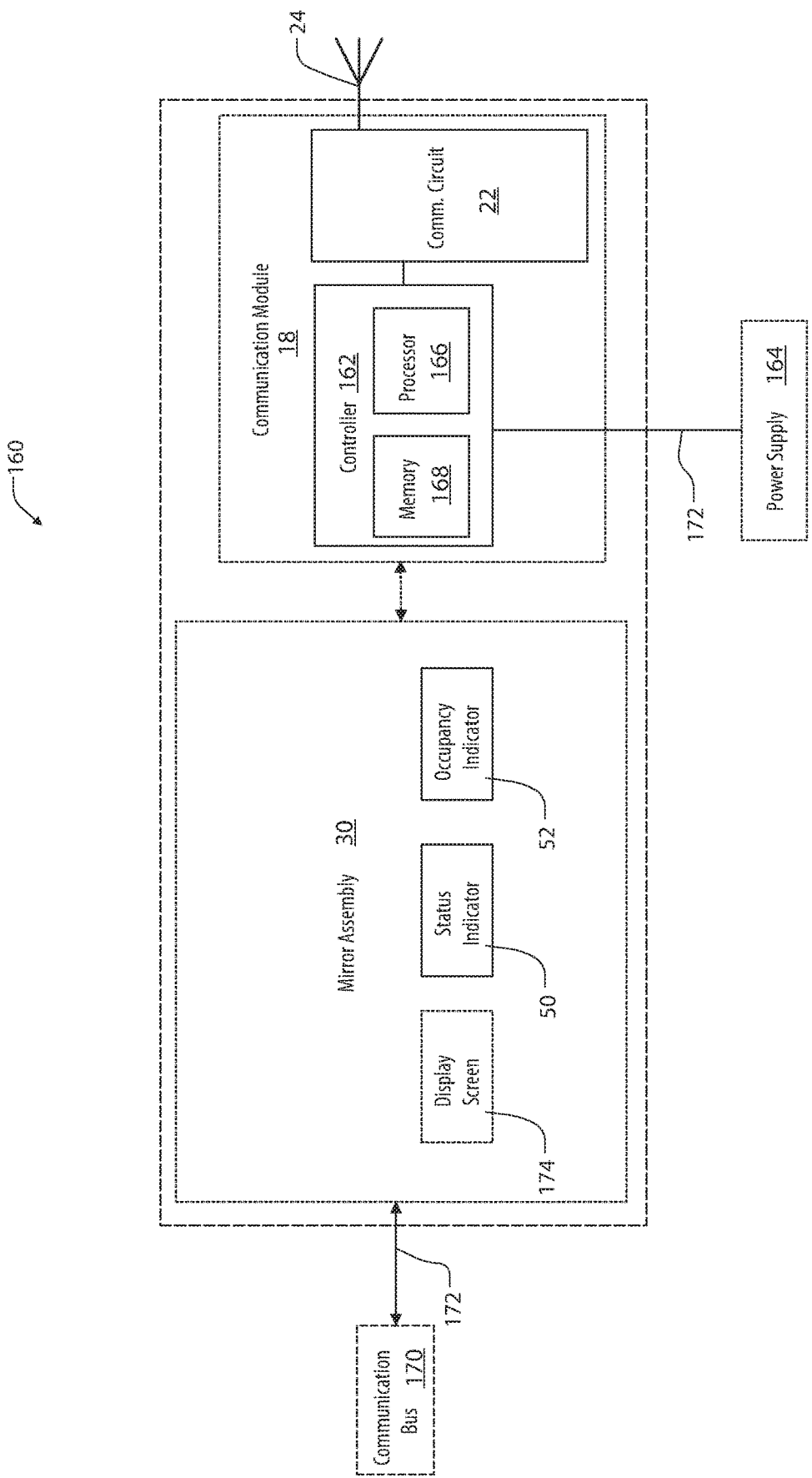

US 10,586,403 B2

COMMUNICATION MODULE AND OCCUPANCY COUNTER

CROSS-REFERENCE TO RELATED APPLICATION

This application claims the benefit of and priority to U.S. Provisional Patent Application No. 62/578,227, filed on Oct. 27, 2017, entitled COMMUNICATION MODULE AND OCCUPANCY COUNTER, the entire disclosure of which is hereby incorporated herein by reference.

TECHNOLOGICAL FIELD

The disclosure relates to a communication module and, more particularly, relates to a wireless communication module for a vehicle.

BRIEF SUMMARY

In an exemplary embodiment, a method for selecting a number of occupants for a wireless communication system is disclosed. The method comprises receiving an input to a user input of a mirror assembly of a vehicle. In response to the input, the method continues by activating a communication module to an active state and activating a status indicator indicating the active state. The method further comprises determining a stored occupant number from a memory and activating an occupancy indicator to illuminate at a first predetermined frequency for a first number of illuminations. The first number of illuminations of the occupancy indicator is equal to the occupant number. The method further comprises monitoring for the user input for an input time period. In response to receiving the input to the user input during the input time period, the method continues by incrementing the occupant number to an updated occupant number.

In another embodiment, a communication apparatus for a vehicle is disclosed. The apparatus comprises a rearview assembly for a vehicle comprising a user interface and at least one status indicator. The apparatus further comprises a wireless communication circuit configured to communicate via a transmission signal. A controller is in communication with a wireless communication circuit, the user interface, and the at least one status indicator. The controller is configured to activate the wireless communication module to an active state in response to an input received by the user interface and identify a stored occupant number from a memory. The controller is further configured to set an active occupant number to the stored occupant number and activate the at least one status indicator to illuminate identifying the stored occupant number.

In yet another embodiment, a communication apparatus for a vehicle is disclosed. The apparatus comprises a rearview assembly for a vehicle comprising a user interface and at least one status indicator. The apparatus further comprises a wireless communication circuit configured to communicate via a transmission signal. A controller is in communication with the wireless communication circuit, the user interface, and the at least one status indicator. The controller is configured to activate the wireless communication module to an active state in response to an input received by the user interface and identify a stored occupant number from a memory. The controller is further configured to set an active occupant number to the stored occupant number and activate the at least one status indicator to illuminate identifying the active occupant number. The controller is further configured to communicate the transmission signal comprising the active occupant number to a toll reader of a roadway toll module.

These and other features, advantages, and objects of the present disclosure will be further understood and appreciated by those skilled in the art by reference to the following specification, claims, and appended drawings.

BRIEF DESCRIPTION OF THE DRAWINGS

FIG. 7 is a block diagram demonstrating a communication system in accordance with the disclosure.

DETAILED DESCRIPTION

Figure 1:
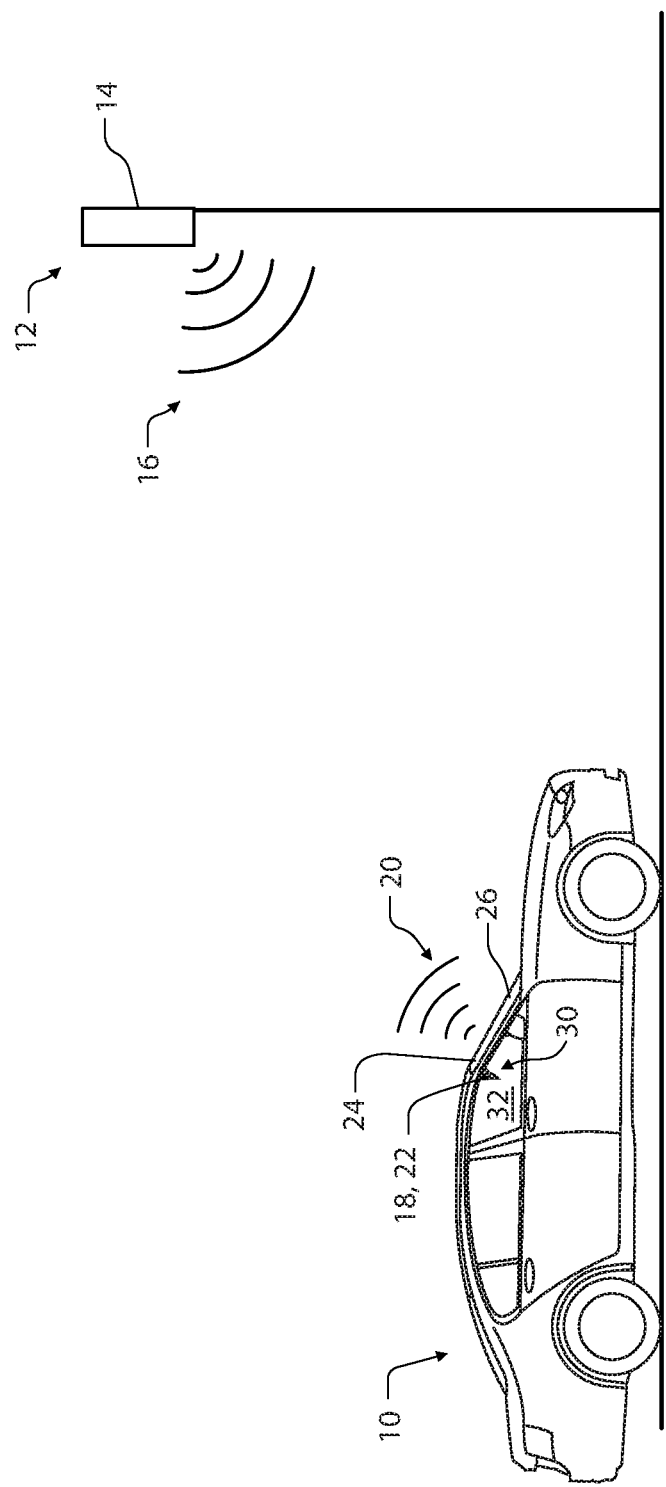
FIG. 1 is a perspective view of a vehicle comprising a communication module entering a toll station.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 is shown approaching a toll station 12 comprising a toll reader 14. The toll reader 14 may be configured to emit a first wireless signal 16 configured to activate a communication module 18 of the vehicle 10. In this way, the communication module 18 may identify a proximity to the toll station 12 and broadcast an identification code via a second wireless signal 20. In response to receiving the second wireless signal 20, the toll reader 14 may record the identification code and apply a toll or fee to an account associated with the vehicle 10.

In some embodiments, the second wireless signal 20 may further be configured to communicate a passenger occupancy of the vehicle 10. The passenger occupancy may be input by an operator of the vehicle 10 such that the second wireless signal 20 may communicate the occupancy of the vehicle 10 to calculate a toll rate or apply a carpool indication for the vehicle 10. In an exemplary embodiment, each of the wireless signals 16 and 20 may correspond to polarized radio frequency signals (e.g. horizontally or vertically polarized signals).

In order to identify a timing to emit the second wireless signal 20, the communication module 18 may comprise a communication circuit 22 (e.g. a transceiver circuit) configured to monitor for the first wireless signal 16. The communication circuit 22 may comprise an antenna 24 disposed proximate to an interior surface of a windshield 26 of the vehicle 10. In some embodiments, one or more components of the communication module 18 (e.g. the communication circuit 22) may be integrated in or utilized in combination with an interior mirror assembly 30. The mirror assembly 30 may correspond to a variety of types of mirrors, including an electro-optic mirror or display mirror comprising a display screen. Accordingly, the communication module 18 may be integrated in a passenger compartment 32 of the vehicle 10 in a variety of ways in accordance with the disclosure.

Figure 2:
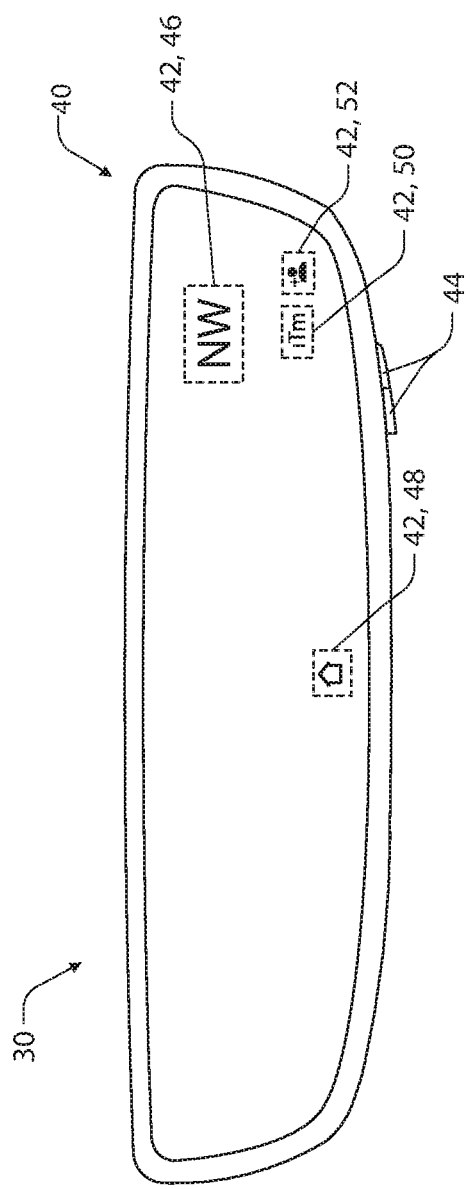
FIG. 2 is a front view of a mirror assembly comprising the communication module.

Referring to FIG. 2, an exemplary embodiment of the mirror assembly 30 is shown. The mirror assembly 30 may be in connection with or disposed proximate to an interior surface of the windshield 26. As previously discussed, the second wireless signal 20 may be configured to communicate a passenger occupancy of the vehicle 10. For example, the passenger occupancy may identify a number of passengers being transported in the vehicle 10 at the time that the second wireless signal 20 is transmitted. The passenger occupancy may be input by a passenger or operator of the vehicle 10 to a user interface 40 in communication with a controller of the communication module 18.

The user interface 40 may be incorporated on the mirror assembly 30. The user interface 40 may comprise one or more indicators 42 and at least one user input 44. The at least one user input 44 may correspond to an electronic or electro-mechanical switch configured to output a signal in response to a depression of the user input 44. For example, the user input 44 may correspond to a relay, a momentary switch, a tactile switch, etc. The controller of communication module 18 may be configured to receive one or more signals from the user input 44 to control various operations of the communication module 18.

The one or more indicators 42 may be configured to identify or visually communicate a status or setting of the communication module 18. In some embodiments, the indicators 42 may comprise one or more icons or symbols configured to communicate information related to the operation of one or more functions of the mirror assembly 30. For example, the indicators 42 may comprise a compass 46, which may be implemented as a matrix display, a liquid crystal display (LCD) or a light-emitting diode (LED) display. Additionally, the indicators 42 may comprise a remote control icon 48 (e.g. a HOMELINK® icon). The remote control icon 48 may be configured to illuminate to identify one or more operations related to a trainable transmitter unit integrated in the mirror assembly.

The trainable transmitter unit may be configured to communicate directly with a garage door opener and may be in the form of a trainable remote garage door opener. The trainable transmitter may be configured to learn signal protocols of a remote transmitter that is provided with the garage door opener and later transmit a signal having those protocols. As such, the trainable transmitter may be operable to accommodate many different garage door opener protocols using multiple codes and signaling frequencies to provide integrated vehicle door access. In addition, the trainable transmitter (e.g. HOMELINK® trainable transmitter) may be capable of remotely controlling various electrical appliances, such as lights, gates, and security systems.

In an exemplary embodiment, the indicators 42 may comprise a toll module state indicator or a status indicator 50 and an occupancy indicator 52. The status indicator 50 may be controlled by the controller to indicate whether a communication or toll function of the communication module 18 is in an active state or a dormant state. For example, the controller may activate the status indicator 50 to illuminate in response to the toll function operating in the active state and deactivate the status indicator 50 in response to the toll function operating in the dormant state. As described herein, the active state may correspond to the communication module 18 detecting the first wireless signal 16 and transmitting the second wireless signal 20. In the dormant state, a transceiver of the communication module 18 may be deactivated such that the wireless signals 16 and 20 are not communicated. The controller and additional components of the communication module 18 are further discussed in reference to FIG. 7.

Additionally, the controller may control the status indicator 50 and the occupancy indicator 52 to illuminate intermittently or in a temporal pattern providing a visual indication or an operating code. The visual indication may be configured to identify an operating state of the communication module 18. The visual indications from the indicators 50 and 52 may indicate a number of occupants programmed into the communication module 18 and/or an operating status of the communication module 18. In this configuration, the communication module 18 may be configured to provide a visual indication of an operating state of the communication module 18 to a passenger or operator of the vehicle 10 by controlling the status indicator 50 and/or the occupancy indicator 52 as discussed herein.

Figure 3:
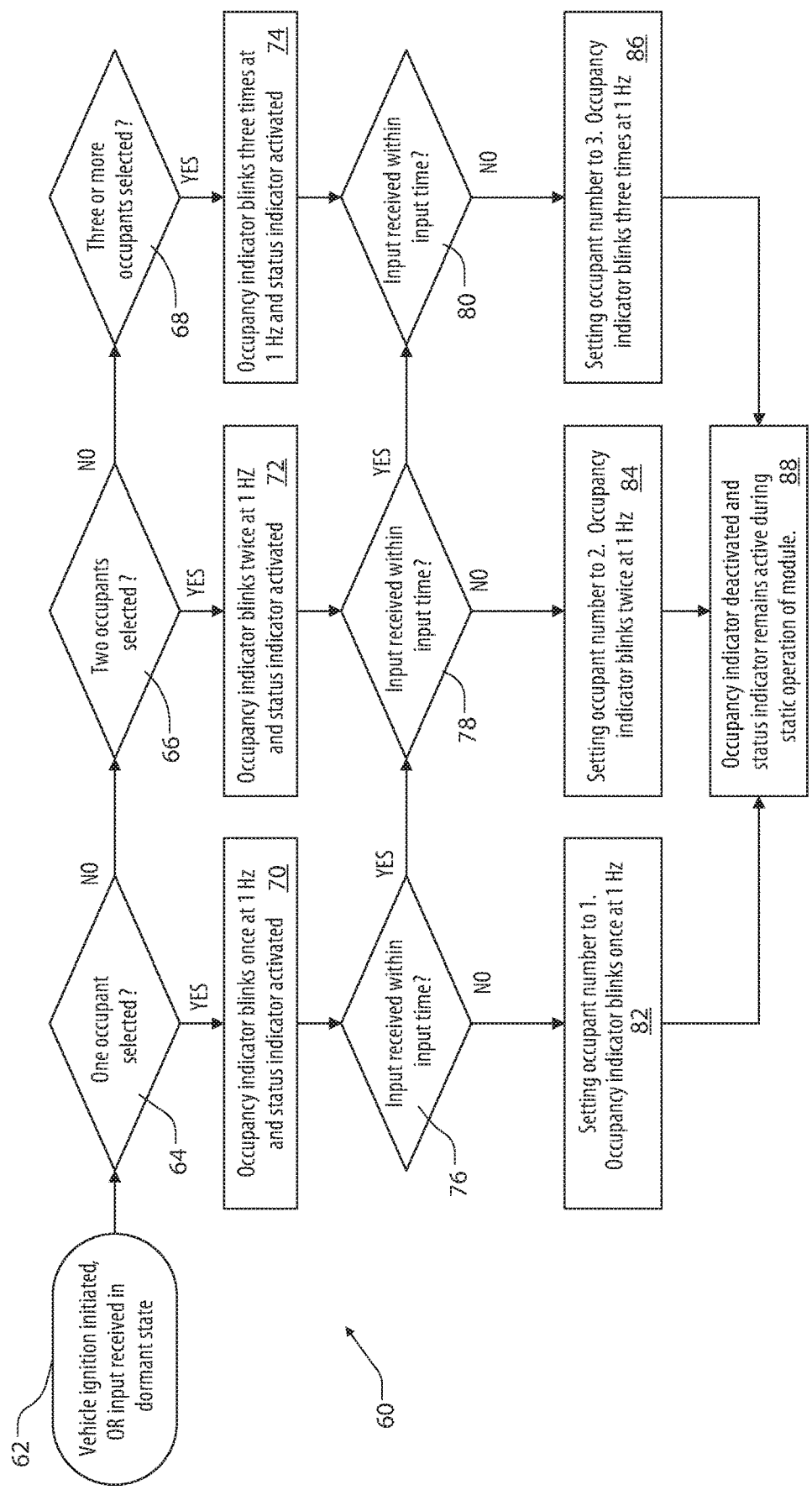
FIG. 3 is a flow chart demonstrating a method for identifying and displaying a vehicle occupancy for a communication module.

Referring now to FIG. 3, a flow chart is shown demonstrating a method 60 for identifying and displaying a vehicle occupancy for the communication module 18. Beginning with step 62, the method 60 may be initiated in response to an ignition or start-up of the vehicle 10. Additionally, the method 60 may be initiated in response to an input being received by the input 44 when the communication module 18 is in a dormant state. In either case, step 62 may result in the communication module 18 being controlled to enter an active state. In response to step 62, the controller of the communication module 18 may identify a number of occupants that were previously selected or specified as a default setting in a memory of the communication module 18. For example, the number of occupants may be specified to be one occupant as a default setting until the number of occupants is changed as provided by the methods described herein. A further detailed description of the controller and memory of the communication module 18 is provided in reference to FIG. 8.

In steps 64, 66, and 68, the method 60 may activate the status indicator 50 to a constantly illuminated state and activate the occupancy indicator 52 to identify the number of occupants previously set by default or by a previous selection as identified in the memory. If one occupant is indicated, the method 60 may proceed from step 64 to step 70, and the controller may control the occupancy indicator 52 to blink once at 1 Hz. If two occupants are indicated, the method 60 may proceed to from step 66 to step 72, and the controller may control the occupancy indicator 52 to blink twice at 1 Hz. If three occupants are indicated, the method 60 may proceed from step 68 to step 74, and the controller may control the occupancy indicator 52 to blink three times at 1 Hz. In this configuration, each of steps 70, 72, and 74 may be configured to indicate a current occupant number or setting of the communication module 18.

If the vehicle 10 is operable to transport additional passengers or occupants, the method 60 may provide for additional settings and corresponding indications from the occupancy indicator 52. Though specific frequencies (e.g. 1 Hz, 2 Hz, 3 Hz, etc.) and times (e.g. 5 sec., 10 sec., etc.) are described for the activation of the indicators 50 and 52 and the timing of various operations discussed herein, the specific frequencies and times are only provided as exemplary embodiments. In general, various times (e.g. a first time, second time, etc.), and frequencies (e.g. a first frequency, a second frequency, etc.) may be applied to suit a desired operation of the communication module 18. Accordingly, the specific operating frequencies and timing of the operations described herein shall not be considered limiting to the disclosure.

Following each of steps 70, 72, and 74, the controller may await the receipt of an input during a predetermined input time (e.g. 5 secs.) in respective steps 76, 78, and 80. During the input time, the controller may change the number of occupants selected for the operation of the communication module 18 in response to a number of inputs received by the user input 44. For example, if the communication module 18 is set to 2 occupants as indicated in step 72, and a single input of the user input 44 is received in step 78, the controller would change the number of occupants to 3 occupants in step 80. If the communication module 18 is set to 3 occupants as indicated in step 74, and a single input of the user input 44 is received in step 80, the controller would change the number of occupants to 1 occupant in step 76. Though not demonstrated in FIG. 4, if the communication module 18 is configured to identify 4 or more occupants, the controller may adjust the occupant number to 4 in step 80 in response to the input received by the user input 44.

Once the input time has expired in each of the steps 76, 78, and 80, the method 60 may further continue to set the occupant number according to the number associated with each of the steps 76, 78, and 80. Following the expiration of the input time in step 76, the controller may continue to step 82, set the occupant number to 1, and control the occupancy indicator 52 to flash once at 1 Hz. Following the expiration of the input time in step 78, the controller may continue to step 84, set the occupant number to 2, and control the occupancy indicator 52 to flash twice at 1 Hz. Following the expiration of the input time in step 80, the controller may continue to step 86, set the occupant number to 3, and control the occupancy indicator 52 to flash three times at 1 Hz. Following each of steps 82, 84, and 86, the method 60 may continue to step 88. In step 88, the controller may deactivate the occupancy indicator 52 and maintain the activation of the status indicator 50 while static operation of the communication module 18 is maintained.

Figure 4:
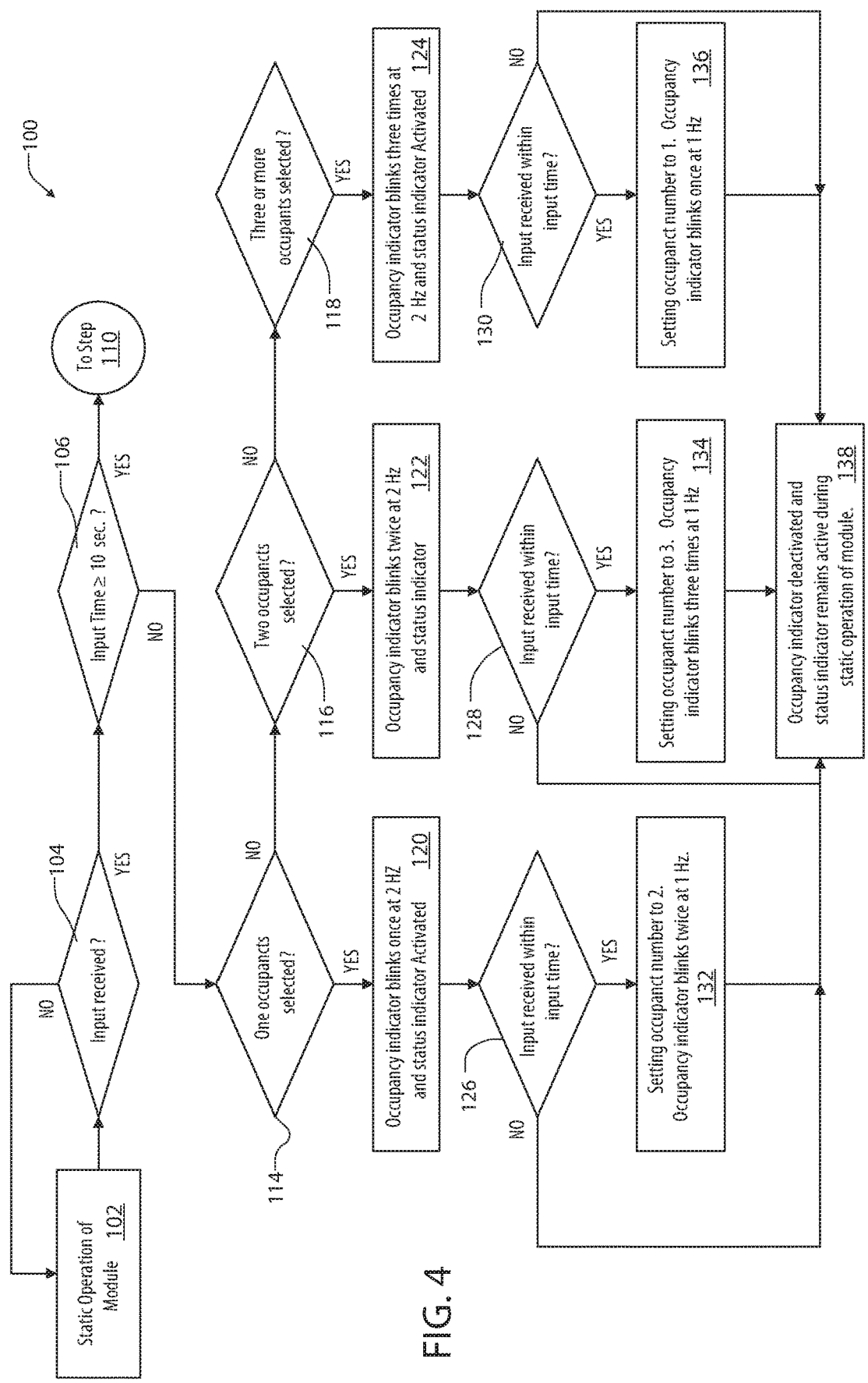
FIG. 4 is a flow chart demonstrating a method for identifying and displaying a vehicle occupancy for a communication module.
Figure 5:
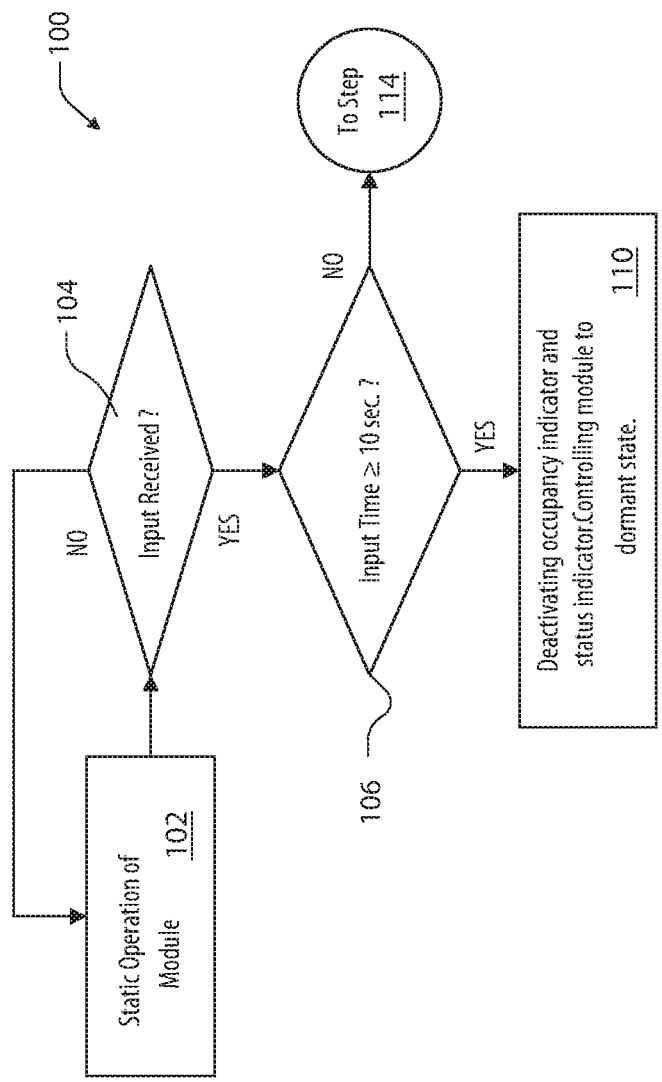
FIG. 5 is a flow chart demonstrating a method for controlling a communication module to enter a dormant state.

Referring now to FIG. 4, a flow chart is shown demonstrating an additional method 100 for identifying and displaying the vehicle occupancy for the communication module 18. The method 100 may begin under static operation of the communication module 18 in the active operating state in step 102. In steps 104 and 106, the method 100 may await a detection of an input to the user input 44. If the input is received in step 104, the controller may detect whether an actuation duration of the user input 44 is greater than 10 seconds. If the duration is greater than ten seconds, the method 100 may continue to step 110, which is shown in FIG. 5. If the duration is less than ten seconds, the method 100 may continue to steps 114, 116, and 118.

In steps 114, 116, and 118, the method 100 may activate the status indicator 50 to a constantly illuminated state and activate the occupancy indicator 52 to identify the number of occupants previously set in the memory. If one occupant is indicated, the method 100 may proceed from step 114 to step 120, and the controller may control the occupancy indicator 52 to blink once at 2 Hz. If two occupants are indicated, the method 100 may proceed from step 116 to step 122, and the controller may control the occupancy indicator 52 to blink twice at 2 Hz. If three occupants are indicated, the method 100 may proceed from step 118 to step 124, and the controller may control the occupancy indicator 52 to blink three times at 2 Hz. In this configuration, each of steps 120, 122, and 124 may be configured to indicate a current occupant number or setting for the communication module 18.

Following each of steps 120, 122, and 124, the controller may await the receipt of an input during a predetermined input time (e.g. 5 secs.) in respective steps 126, 128, and 130. If an input is received during the input time in steps 126, 128, or 130, the controller may change the number of occupants selected for the operation of the communication module 18 in steps 132, 134, or 136 in response to an actuation received by the user input 44. For example, if the communication module 18 is set to 1 occupant as indicated in step 120, and a single input of the user input 44 is received in step 126, the controller would change the number of occupants to 2 occupants in step 132. Additionally, in step 132 the controller may control the occupancy indicator to flash twice at 1 Hz.

If the communication module 18 is set to 2 occupants as indicated in step 122, and a single input of the user input 44 is received in step 128, the controller would change the number of occupants to 3 occupants in step 134. Additionally, in step 134 the controller may control the occupancy indicator to flash three times at 1 Hz. If the communication module 18 is set to 3 occupants as indicated in step 124, and a single input of the user input 44 is received in step 130, the controller would change the number of occupants to 1 occupant in step 136. Additionally, in step 136 the controller may control the occupancy indicator to flash once at 1 Hz. Though not demonstrated in FIG. 5, if the communication module 18 is configured to identify 4 or more occupants, the controller may adjust the occupant number to 4 in step 130 in response to the input received by the user input 44.

If the input time expires in any of the steps 126, 128, or 130, the method 100 may maintain the previous setting for the occupant number and continue to step 138. If the input is received in steps 126, 128, or 130, the controller controls the occupancy indicator 52 according to the occupancy number in steps 132, 134, or 136 and then continues to step 138. In step 138, the controller may deactivate the occupancy indicator 52 and maintain the operation of the status indicator 50 while static operation of the communication module 18 is maintained.

Referring now to FIG. 5, the method 100 is continued from FIG. 4. As shown, the method 100 may begin under static operation of the communication module 18 in the active operating state in step 102. In steps 104 and 106, the method 100 may await a detection of an input to the user input 44. If the input is received in step 104, the controller may detect whether an actuation duration of the user input 44 is greater than 10 seconds. If the duration is greater than ten seconds, the method 100 may continue to step 110. If the duration is less than ten seconds, the method 100 may continue to steps 114, 116, and 118 as shown in FIG. 4. In step 110, the method 100 may command the controller to deactivate the occupancy indicator 52 and the status indicator 50. Additionally, the controller may control the communication module 18 to enter the dormant state.

Figure 6:
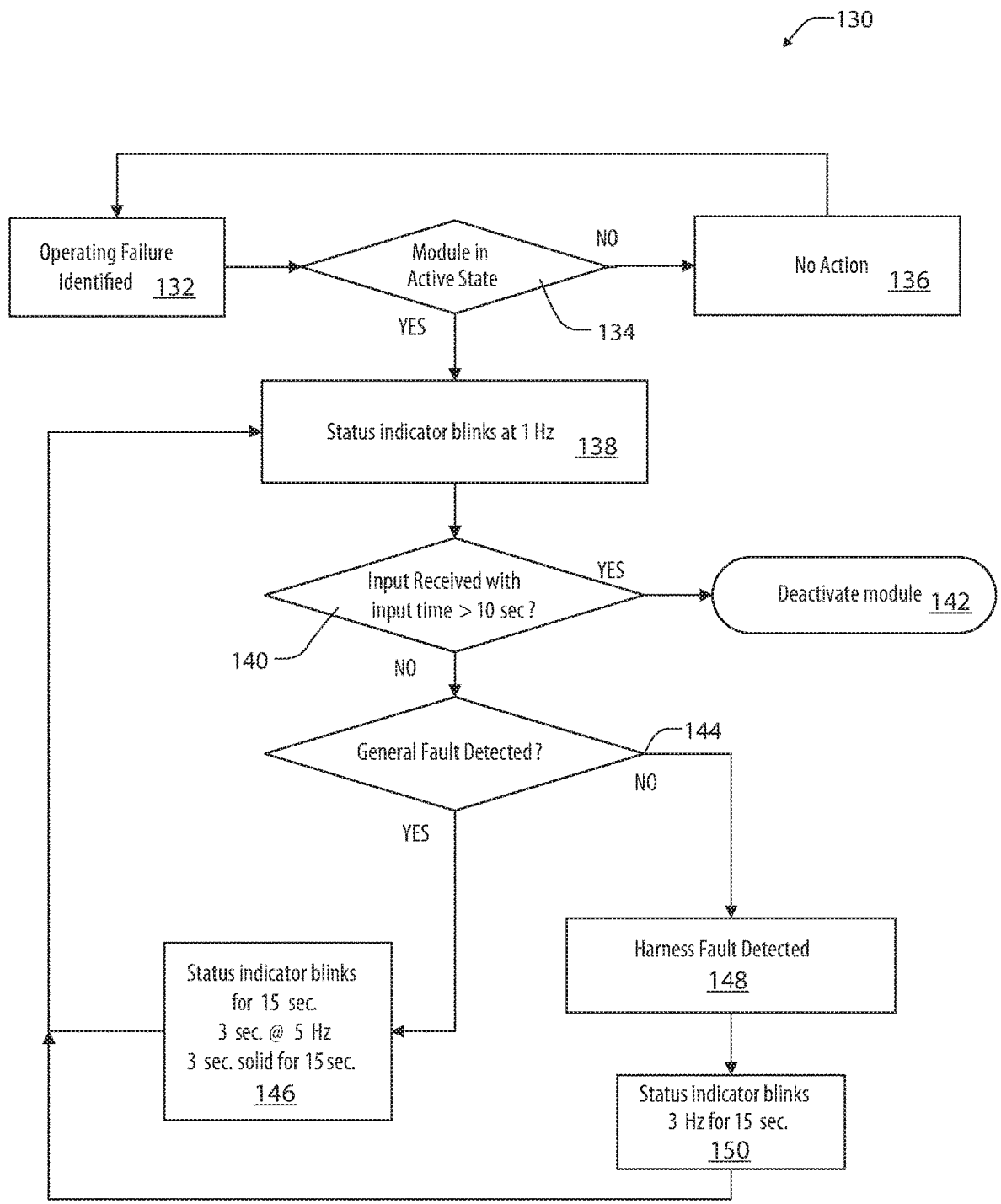
FIG. 6 is a flow chart demonstrating a method for displaying and controlling a failure of a communication module.

Referring now to FIG. 6, a flow chart is shown demonstrating a method 130 for displaying a hardware failure for the communication module 18. The method 130 may begin by the controller identifying an error in the operation of the communication module 18. Such an error may result from a hardware error of any of the components of the communication module 18 causing an operation timeout, failure, or various other malfunctions of the processor, the memory, the communication circuit 22, etc. Additionally, errors may arise due to an improper connection or disconnection between the communication module 18 and a wiring harness of the communication module 18. Accordingly, the communication module 18 may be configured to identify the hardware error and distinguish the hardware error due to a faulty connection with the wiring harness.

In response to identifying the operating failure in step 132, the method 130 may determine if the communication module 18 is in an active state in step 134. If the communication module 18 is in the dormant state (inactive), the controller may continue to not take any further action (136). However, if the communication module 18 is active in step 134, the controller may activate the status indicator 50 to blink or flash periodically at 1 Hz (138). The controller may then continue to monitor the user input 44.

In response to receiving an input via the user input 44, the controller may determine if the input is received for a duration greater than a predetermined time (e.g. 10 sec.) (140). If the input is received in step 140, the controller may continue to deactivate the communication modules 18 in step 142. If the input is not received in step 140, the controller may continue to determine if the operating failure corresponds to a general fault of the communication module 18 (144). That is, the controller may perform internal diagnostics on the inputs and operating conditions of the communication module 18 and the related circuits to identify whether an internal operating fault is actively occurring. If the general fault is detected in step 144, the controller may control the status indicator 50 to blink periodically in a predetermined pattern (146). The pattern may correspond to a variety of identifiable variations, and, in an exemplary embodiment, may comprise activating the status indicator 50 periodically for 15 seconds alternating at 5 Hz for three seconds, then solid for three seconds.

If the general fault is not detected in step 144, the controller may infer that the fault corresponds to a harness or connection related fault (148). In response to the harness fault, the controller may activate the status indicator 50 to illuminate periodically at 3 Hz for 15 seconds. Following each of steps 146 and 150, the controller may continue to step 138 to activate the status indicator 50 to illuminate periodically at 1 Hz. In this way, the controller of the communication module 18 may provide for communication module 18 to output an indication identifying the operating failure of one of more components of circuits for troubleshooting and/or repair.

Referring now to FIG. 7, a block diagram of a communication system 160 comprising the communication module 18 is shown. The communication module 18 may comprise a controller 162 in communication with the communication circuit 22 and the antenna 24. The communication module 18 may be configured to draw power from a power supply 164. The power supply 164 may correspond to a battery of the communication circuit 22 or a direct current power supply from the vehicle 10.

As discussed herein, the controller 162 may be configured to wirelessly communicate with the toll reader 14 of the toll station 12. To support such communication and the various operations discussed herein, the controller 162 may comprise a processor 166 and a memory 168. The memory 168 may be configured to store one or more instructions to support the processing steps of the processor 166 in order to enable the various methods discussed herein.

The controller 162 of the communication module 18 may further be in communication with the interior mirror assembly 30 or other devices incorporated in the vehicle 10. In this configuration, the controller 162 may be operable to communicate via a vehicle communication bus 170. The communication bus 170 and the power supply 164 from the vehicle 10 may be in conductive communication with the mirror assembly 30 and/or the communication module 18 via a wiring harness 172. Accordingly, the controller 162 may be operable to communicate with a number of vehicle systems (e.g. a navigation system, vehicle control module, etc.).

The status indicator 50 and the occupancy indicator 52 may be integrated in the mirror assembly 30 and be configured to project light through a mirrored surface of the assembly 30. Each of the indicators 50 and 52 may correspond to light-emitting devices, such as light-emitting diodes (LEDs) or other light-emitting devices. In some embodiments, the interior mirror assembly 30 may comprise a display screen 174. The display screen 174 may comprise any form of video screen, for example a light-emitting diode (LED) display, organic LED display, liquid crystal display (LCD), etc. In this configuration, the controller 162 may display various forms of image or video data on the display screen 174. Additionally, in some embodiments, the indicators 50 and 52 may be integrated into the display screen 174 as graphics.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

The invention claimed is:

1. A method of selecting a number of occupants for a wireless communication system, the method comprising:
   receiving an input to a user interface of a mirror assembly of a vehicle;
   in response to the input, activating a communication module to an active state and activating a status indicator indicating the active state;
   determining a stored occupant number from a memory;
   activating an occupancy indicator to illuminate at a first predetermined frequency for a first number of illuminations, wherein a first number of illuminations of the occupancy indicator is equal to the occupant number;
   identifying a first fault state and a second fault state of the wireless communication system, wherein the first fault state further comprises an operation error by a controller of the communication circuit and the second fault state comprises a connection error of a wiring harness in communication with the controller; and activating the status indicator to illuminate at a first predetermined frequency in response to the first fault state and illuminate at a second frequency in response to the second fault state.

2. The method according to claim 1, further comprising:
in response to activating the communication module, monitoring the user interface for an input time period.

3. The method according to claim 2, further comprising:
in response to receiving the input to the user interface during the input time period, incrementing the occupant number to an updated occupant number.

4. The method according to claim 3, further comprising:
in response to the lapse of the input time period, activating the occupancy indicator to illuminate at a second predetermined frequency for a second number of illuminations, wherein a second number of illuminations of the occupancy indicator is equal to the updated occupancy number.

5. The method according to claim 1, further comprising:
monitoring the user input for an input exceeding a predetermined time period; and
in response to identifying the input exceeding the predetermined time period, deactivating the communication module to a dormant state and deactivating the status indicator indicating the dormant state.

6. The method according to claim 1, further comprising:
activating the communication circuit to transmit a transmission signal identifying an occupancy of the vehicle.

7. A communication apparatus for a vehicle comprising:
a rearview assembly for a vehicle comprising a user interface and at least one status indicator;
a wireless communication circuit configured to communicate via a transmission signal; and
a controller in communication with the wireless communication circuit, the user interface, and the at least one status indicator, wherein the controller is configured to:
activate the wireless communication module to an active state in response to an input received by the user interface;
identify a stored occupant number from a memory;
activate an occupancy indicator to illuminate at a first predetermined frequency for a first number of illuminations, wherein a first number of illuminations of the occupancy indicator is equal to the occupant number;
identify at least one fault state of the wireless communication system, wherein the at least one fault state comprises a first fault state and a second fault state, wherein the at least one fault state comprises at least one of a connection error of a wiring harness in communication with the controller and an operation error by a controller of the communication circuit; and
activate the status indicator to illuminate at a first predetermined frequency in response to the first fault state and a second predetermined frequency in response to the second fault state.

8. The communication apparatus according to claim 7, wherein the rearview assembly comprises a viewing portion comprising the at least one status indicator.

9. The communication apparatus according to claim 8, wherein the at least one status indicator is configured to illuminate an icon in the viewing portion.

10. The communication apparatus according to claim 7, wherein the at least one status indicator comprises a toll status indicator and an occupant status indicator.

11. The communication apparatus according to claim 7, wherein the controller is further configured to:
monitor the user interface for an input time period after identifying the stored occupant number.

12. The communication apparatus according to claim 11, wherein the controller is further configured to:
in response to receiving an input to the user interface during the input time period, increment the active occupant number.

13. The communication apparatus according to claim 12, wherein in response to a lapse of the input time period, the controller is further configured to control the wireless communication circuit to transmit the active occupant number identifying the active occupant number via the transmission signal.

14. A method of selecting a number of occupants for a wireless communication system, the method comprising:
receiving an input to a user interface of a mirror assembly of a vehicle;
in response to the input, activating a communication module to an active state and activating a status indicator indicating the active state;
determining a stored occupant number from a memory;
activating an occupancy indicator to illuminate at a first predetermined frequency for a first number of illuminations, wherein the first number of illuminations of the occupancy indicator is equal to the occupant number;
identifying a plurality of fault states of the wireless communication system, wherein the plurality of fault states comprises at least one of a connection error of a wiring harness in communication with the controller and a controller error of an operation of the communication system; and
activating the status indicator to illuminate at a plurality of predetermined frequencies, wherein the predetermined frequencies are configured to indicate one of the plurality of fault states.

* * * * *